(12) United States Patent
Hansen et al.

(10) Patent No.: US 7,789,515 B2
(45) Date of Patent: Sep. 7, 2010

(54) PROJECTION DEVICE WITH A FOLDED OPTICAL PATH AND WIRE-GRID POLARIZER

(75) Inventors: Douglas P. Hansen, Spanish Fork, UT (US); Eric Gardner, Eagle Mountain, UT (US)

(73) Assignee: Moxtek, Inc., Orem, UT (US)

( * ) Notice: Subject to any disclaimer, the term of this patent is extended or adjusted under 35 U.S.C. 154(b) by 782 days.

(21) Appl. No.: 11/749,847

(22) Filed: May 17, 2007

(65) Prior Publication Data

US 2008/0284984 A1    Nov. 20, 2008

(51) Int. Cl.
G03B 21/14    (2006.01)
G03B 21/00    (2006.01)
G02B 5/30    (2006.01)

(52) U.S. Cl. .............................. 353/20; 353/31; 359/486
(58) Field of Classification Search ................... 353/20, 353/31–34, 37, 122; 359/486, 487; 349/8, 349/9
See application file for complete search history.

(56) References Cited

U.S. PATENT DOCUMENTS

| | | | |
|---|---|---|---|
| 2,224,214 A | 12/1940 | Brown |
| 2,237,567 A | 4/1941 | Land |
| 2,287,598 A | 6/1942 | Brown |
| 2,391,451 A | 12/1945 | Fischer |
| 2,403,731 A | 7/1946 | MacNeille |
| 2,605,352 A | 7/1952 | Fishcer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,235,630 A | 2/1966 | Doherty et al. |

(Continued)

FOREIGN PATENT DOCUMENTS

AU    2003267964    12/2003

(Continued)

OTHER PUBLICATIONS

Lloyd William Taylor, Manual of Advanced Undergraduate Experiments in Physics, p. 302 (1959).

(Continued)

*Primary Examiner*—Georgia Y Epps
*Assistant Examiner*—Don Williams
(74) *Attorney, Agent, or Firm*—Thorpe North & Western, LLP

(57) ABSTRACT

A folded projection display system includes a wire-grid polarizer placed immediately behind the system's imaging screen. The display system includes an image projector that projects an image beam containing light of a predetermined linear polarization toward the imaging screen. The wire-grid polarizer reflects the light in the image beam away from the screen. The reflected image beam then encounters a ¼-wavelength achromatic retarder that converts the linear polarization to circular polarization. The image beam next hits a mirror that reflects the light back through the ¼-wavelength achromatic retarder, which converts the circular polarization back to linear polarization, with the polarization director rotated 90 degrees from the original polarization direction. The wire-grid polarizer then allows the light to pass through to the image screen.

15 Claims, 9 Drawing Sheets

U.S. PATENT DOCUMENTS

| | | |
|---|---|---|
| 3,291,550 A | 12/1966 | Bird et al. |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmuller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,895,769 A | 1/1990 | Land et al. |
| 4,904,060 A | 2/1990 | Grupp |
| 4,913,529 A | 4/1990 | Goldenberg et al. |
| 4,939,526 A | 7/1990 | Tsuda |
| 4,946,231 A | 8/1990 | Pistor |
| 4,966,438 A | 10/1990 | Mouchart et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur et al. |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,177,635 A | 1/1993 | Keilmann |
| 5,196,926 A | 3/1993 | Lee |
| 5,196,953 A | 3/1993 | Yeh et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu et al. |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,422,756 A | 6/1995 | Weber |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,609,939 A | 3/1997 | Petersen et al. |
| 5,612,820 A | 3/1997 | Schrenk et al. |
| 5,619,352 A | 4/1997 | Koch et al. |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,719,695 A | 2/1998 | Heimbuch |
| 5,731,246 A | 3/1998 | Bakeman, Jr. et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |

| Patent No. | Date | Inventor |
|---|---|---|
| 5,826,960 A | 10/1998 | Gotoh et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,886,754 A | 3/1999 | Kuo |
| 5,890,095 A | 3/1999 | Barbour et al. |
| 5,898,521 A | 4/1999 | Okada |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,978,056 A | 11/1999 | Shintani et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,053,616 A | 4/2000 | Fujimori et al. |
| 6,055,103 A | 4/2000 | Woodgate et al. |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,108,131 A | 8/2000 | Hansen et al. |
| 6,122,103 A | 9/2000 | Perkins et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,185,041 B1 | 2/2001 | Tadic-Galeb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,250,762 B1 | 6/2001 | Kuijper |
| 6,282,025 B1 | 8/2001 | Huang et al. |
| 6,288,840 B1 | 9/2001 | Perkins et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,585,378 B2 | 7/2003 | Kurtz et al. |
| 6,643,077 B2 | 11/2003 | Magarill et al. |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,704,469 B1 | 3/2004 | Xie et al. |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,813,077 B2 | 11/2004 | Borrelli et al. |
| 6,821,135 B1 | 11/2004 | Martin |
| 6,829,090 B2 | 12/2004 | Katsumata et al. |
| 6,844,971 B2 | 1/2005 | Silverstein et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,954,245 B2 | 10/2005 | Mi et al. |
| 6,976,759 B2 | 12/2005 | Magarill et al. |
| 7,013,064 B2 | 3/2006 | Wang |
| 7,023,512 B2 | 4/2006 | Kurtz et al. |
| 7,023,602 B2 | 4/2006 | Aastuen et al. |
| 7,050,233 B2 | 5/2006 | Nikolov et al. |
| 7,050,234 B2 | 5/2006 | Gage et al. |
| 7,113,335 B2 | 9/2006 | Sales |
| 7,561,332 B2 * | 7/2009 | Little et al. ................. 359/486 |
| 2002/0001128 A1 | 1/2002 | Moseley et al. |
| 2002/0015135 A1 | 2/2002 | Hansen et al. |
| 2002/0122235 A1 | 9/2002 | Kurtz et al. |
| 2002/0167727 A1 | 11/2002 | Hansen et al. |
| 2002/0191286 A1 | 12/2002 | Gale et al. |
| 2003/0072079 A1 | 4/2003 | Silverstein et al. |
| 2003/0081179 A1 | 5/2003 | Pentico et al. |
| 2003/0117708 A1 | 6/2003 | Kane |
| 2003/0161029 A1 | 8/2003 | Kurtz et al. |
| 2003/0180024 A1 | 9/2003 | Edlinger et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2004/0008416 A1 | 1/2004 | Okuno |
| 2004/0042101 A1 | 3/2004 | Wang et al. |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0165126 A1 | 8/2004 | Ooi et al. |
| 2004/0201889 A1 | 10/2004 | Wang et al. |
| 2004/0218270 A1 | 11/2004 | Wang |
| 2004/0240777 A1 | 12/2004 | Woodgate et al. |
| 2004/0258355 A1 | 12/2004 | Wang et al. |
| 2005/0045799 A1 | 3/2005 | Deng et al. |
| 2005/0084613 A1 | 4/2005 | Wang et al. |

| | | |
|---|---|---|
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0201656 A1 | 9/2005 | Nikolov et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0113279 A1 | 6/2006 | Little |
| 2006/0118514 A1 | 6/2006 | Little et al. |
| 2006/0119937 A1 | 6/2006 | Perkins et al. |

FOREIGN PATENT DOCUMENTS

| | | |
|---|---|---|
| CH | 0296391 | 2/1954 |
| CN | 03815026.3 | 8/2005 |
| CN | 1692291 | 11/2005 |
| CN | 03814105.1 | 11/2005 |
| DE | 416157 | 7/1925 |
| DE | 296391 | 2/1950 |
| DE | 3707984 A1 | 9/1988 |
| DE | 103 27 963 | 1/2005 |
| EP | 0317910 A1 | 5/1989 |
| EP | 0336334 B1 | 10/1989 |
| EP | 0349309 B1 | 1/1990 |
| EP | 0357946 B1 | 3/1990 |
| EP | 0407830 B1 | 1/1991 |
| EP | 0416157 A1 | 3/1991 |
| EP | 0488544 A1 | 6/1992 |
| EP | 0507445 A2 | 10/1992 |
| EP | 0518111 A1 | 12/1992 |
| EP | 0543061 A1 | 5/1993 |
| EP | 566 004 | 10/1993 |
| EP | 0588937 B1 | 3/1994 |
| EP | 0606940 A2 | 7/1994 |
| EP | 0349144 B1 | 9/1994 |
| EP | 0634674 A2 | 1/1995 |
| EP | 0670506 A1 | 9/1995 |
| EP | 0521591 B1 | 10/1995 |
| EP | 0731456 | 9/1996 |
| EP | 0744634 A2 | 11/1996 |
| JP | 02-308106 | 12/1990 |
| JP | 04 366916 | 6/1991 |
| JP | 4-12241 | 1/1992 |
| JP | 5134115 | 5/1993 |
| JP | 7-146469 | 6/1995 |
| JP | 9090122 | 4/1997 |
| JP | 9090129 | 4/1997 |
| JP | 9178943 | 7/1997 |
| JP | 09-507926 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 10-268301 | 10/1998 |
| JP | 1-164819 | 3/1999 |
| JP | 11142650 | 5/1999 |
| JP | 11237507 | 8/1999 |
| JP | 11-258603 | 9/1999 |
| JP | 2000-147487 | 5/2000 |
| JP | 2000284117 | 10/2000 |
| JP | 2001074935 | 3/2001 |
| JP | 2004157159 | 6/2004 |
| JP | 2004309903 | 11/2004 |
| JP | 20054513547 | 5/2005 |
| JP | 2005195824 | 7/2005 |
| JP | 2005534981 | 11/2005 |
| JP | 2006047813 | 2/2006 |
| JP | 2006201540 | 8/2006 |
| SU | 1283685 | 1/1987 |
| SU | 1781659 A1 | 12/1992 |
| WO | WO96/15474 | 5/1996 |
| WO | WO97/01788 | 1/1997 |
| WO | WO0070386 | 11/2000 |
| WO | WO 02/21205 | 3/2002 |
| WO | WO03/054619 | 7/2003 |
| WO | WO03/102652 | 12/2003 |
| WO | WO03/107046 | 12/2003 |
| WO | WO2004013684 | 2/2004 |
| WO | WO2004/019070 | 3/2004 |
| WO | WO2004/072692 | 8/2004 |
| WO | WO2005019503 | 3/2005 |
| WO | WO2005/065182 | 7/2005 |
| WO | WO2005079233 | 9/2005 |
| WO | WO2005/101112 | 10/2005 |
| WO | WO2005/123277 | 12/2005 |
| WO | WO2006/014408 | 2/2006 |

OTHER PUBLICATIONS

Flanders, Application of ≈100 Å linewidth structures fabricated by shadowing technique", J. Vac. Sci. Technol., 19(4), Nov./Dec. 1981.

Kuta et al. "Coupled-wave analysis of lamellar metal transmission gratings for the visible and the infrared," J. Opt. Soc. Am. A/vol. 12, No. 5/May 1995.

Lockbihler et al. "Diffraction from highly conducting wire gratings of arbitrary cross-section," Journal of Modern Optics, 1993, vol. 40, No. 7, pp. 1273-1298.

Novak et al., "Far infrared polarizing grids for use at cryogenic temperatures," Applied Optics, Aug. 15, 1989/vol. 28, No. 15, pp. 3425-3427.

Auton et al, "Grid Polarizers for Use in the Near Infrared," Infrared Physics, 1972, vol. 12, pp. 95-100.

Stenkamp et al, "Grid polarizer for the visible spectral region," SPIE vol. 2213 pp. 288-296.

Handbook of Optics, 1978, pp. 10-68-10-77.

Handbook of Optics vol. II, $2^{nd}$ Edition, pp. 3.32-3.35.

Glytsis et al, "High-spatial-frequency binary and multilevel stairstep gratings: polarization-selective mirrors and broadband antireflection surfaces," Applied Optics Aug. 1, 1992 vol. 31, No. 22 pp. 4459-4470.

Auton, "Infrared Transmission Polarizers by Photolithography," Applied Optics Jun. 1967 vol. 6, No. 6, pp. 1023-1027.

Haggans et al., "Lamellar gratings as polarization components for specularly reflected beams," Journal of Modern Optics, 1993, vol. 40, No. 4, pp. 675-686.

Nordin et al., "Micropolarizer array for infrared imaging polarimetry", J. Op. Soc. Am. A. vol. 16 No. 5/May 1999.

Bird et al., "The Wire Grid as a Near-Infrared Polarizer," J. Op. Soc. Am. vol. 50 No. 9 (1960).

Optics $9^{th}$ Edition, pp. 338-339 (1980).

Whitbourn et al, "Phase shifts in transmission line models of thin periodic metal grids," Applied Optics 15 Aug. 1989 vol. 28, No. 15, pp. 3511-3515.

Enger et al, "Optical elements with ultrahigh spatial-frequency surface corrugations," Applied Optics Oct. 15, 1983, vol. 22, No. 20 pp. 3220-3228.

Knop, "Reflection Grating Polarizer for the Infrared," Optics Communications vol. 26, No. 3, Sep. 1978.

Hass et al, "Sheet Infrared Transmission Polarizers," Applied Optics Aug. 1965, vol. 4, No. 8 pp. 1027-1031.

Flanders, "Submicron periodicity gratings as artificial anisotropic dielectrics," Appl. Phys. Lett. 42 (6), Mar. 15, 1983, pp. 492-494.

Li Li et al , "Visible broadband, wide-angle, thin-film multilayer polarizing beam splitter," Applied Optics May 1, 1996, vol. 35, No. 13, pp. 2221-2224.

Sonek et al., "Ultraviolet grating polarizers," J. Vac. Sci. Technol., 19(4), Nov./Dec. 1981, pp. 921-923.

N.M. Ceglio, Invited Review "Revolution in X-Ray Optics", J. X-Ray Science & Tech. 1, 7-78 (1989).

Dainty, et al, "Measurements of light scattering by characterized random rough surface", Waves in Random Media 3 (1991).

DeSanto et al, "Rough surface scattering", Waves in Random Media 1 (1991).

Lavin, "Specular Reflection", Monographs on App. Opt. No. 2.

Zanzucchi et al., "Corrosion Inhibitors for Aluminum Films" David Sarnoff Research Center, Princeton, NJ 08543-5300.

Moshier et al. "The Corrosion and Passively of Aluminum Exposed to Dilute Sodium Sulfate Solutions." Corrosion Science vol. 27. No. 8 pp. 785-801 1987.

Scandurra, et al. "Corrosion Inhibition of Al Metal in Microelectronic Devices Assemble in Plastic Packages." Journal of the Electrochemical Society, 148 (8) B289-B292 (2001).

Takano, Kuniyoshi et al. "Cube polarizers by the use of metal particles in anodic alumina films." Applied Optics, vol. 33, No. 16, 3507-3512, Jun. 1, 1994.

Lopez, et al. "Wave-plate polarizing beam splitter based on a form-birefringent multilayer grating." Optics Letters, vol. 23, No. 20, pp. 1627-1629, Oct. 15, 1998.

Chen, J. et al. "Optimum film compensation modes for TN and VA LCDs" SID 98 Digest, pp. 315-318, 1998.

Richter, Ivan et al. "Design considerations of form birefringent microstructures." Applied Optics, vol. 34, No. 14, pp. 2421-2429, May 10, 1995.

Tyan, Rong-Chung et al. "Design, fabrication, and characterization of form-birefringent multilayer polarizing beam splitter." Optical Society of America, vol. 14, No. 7, pp. 1627-1636, Jul. 1997.

Ho, G H et al. "The mechanical-optical properties of wire-grid type polarizer in projection display system." SID 02 Digest, pp. 648-651, 2002.

Kostal, Hubert, NanoTechnology "using advanced lithography to pattern nano-optic devices" www.solid-state.com, Sep. 2005, p. 26 and 29.

Kostal, Hubert "Nano-optics: robust, optical devices for demanding applications" Military & Aerospace Electronics, Jul. 2005, 6 pages.

Kostal, Hubert "Nano-optic devices enable integrated fabrication" www.laserfocusworld.com, Jun. 2004 pp. 155, 157-159.

Wang, Jian et al. "Free-Space nano-optical devices and integration: design, fabrication, and manufacturing" Bell Labs Technical Journal, 2005 pp. 107-127, vol. 10, No. 3.

Wang et al. "Diffractive optics: nanoimprint lithography enables fabrication of subwavelength optics" LaserFocusWorld, http://lfw.pennnet.com/Articles/Article_Dispaly.cf... Apr. 19, 2006, 6 pages.

Wang et al. "High-performance nanowire-grid polarizers" Optical Society of America 2005, pp. 195-197, vol. 30, No. 2.

Wang et al. "Fabrication of a new broadband waveguide polarizer with a double-layer 190 nm period metal-gratings using nanoimprint lithography" Journal Vac. Sci. Technology B, Nov./Dec. 1999, pp. 2957-2960, vol. 17, No. 6.

Savas et al. "Achromatic interferometric lithography for 100-nm-period gratings and grids" Journal Vac. Sci. Technology B, Nov./Dec. 1995, pp. 2732-2735, vol. 13, No. 6.

Haisma et al. "Mold-assisted nanolithography: a process for reliable pattern replication" Journal Vac. Sci. Technology B, Nov./Dec. 1996, pp. 4124-4128, vol. 14, No. 6.

Wang et al. "High-performance large-area ultra-broadband (UV to IR) nanowire-grid polarizers and polarizing beam-splitters" Proc. of SPIE 2005, pp. 1-12, vol. 5931.

Wang et al. "Monolithically integrated isolators based on nanowire-grid polarizers" IEEE, Photonics Technology Letters, Feb. 2005, pp. 396-398, vol. 17, No. 2.

Deng et al. "Multiscale structures for polarization control by using imprint and UV lithography" Proc. of SPIE, 2005, pp. 1-12. vol. 6003.

Kostal et al. "MEMS Meets Nano-optics The marriage of MEMES and nano-optics promises a new and viable platform for tunable optical filters" www.fiberoptictechnology.net, Fiber Optic Technology, Nov. 2005, pp. 8-13.

Kostal et al. "Adding parts for a greater whole" SPIE's oeMagazine, May 2003, pp. 24-26.

Deng et al. "Wideband antireflective polarizers based on integrated diffractive multilayer microstructures" Optics Letters, Feb. 1, 2006, pp. 344-346, vol. 31., No. 3.

Chen, et al. "Novel polymer patterns formed by lithographically induced self-assembly (LISA)", American Chemical Society, Jan. 2005, pp. 818-821, vol. 21, No. 3.

Park, et al. "Nano-optics redefine rules for optical processing" NanoOptic Corp, 3 pages.

Baur, "A new type of beam splitting polarizer cube," Meadowlark Optics, 2005, pp. 1-9.

* cited by examiner

# PROJECTION DEVICE WITH A FOLDED OPTICAL PATH AND WIRE-GRID POLARIZER

BACKGROUND

1. Field of the Invention

The present invention relates generally to a rear-projection display system which utilizes a wire-grid polarizing beamsplitter in the projected image path to increase the optical path length from the display system to the image screen. The invention relates more specifically to an optimized wire-grid polarizing beamsplitter configuration used to increase projected optical path length in a rear-projection system.

2. Related Art

Rear-projection television screen size is dependent on the optical path length of the projected image. As the optical path length is increased the size of the projected image is also increased. One method of increasing the optical path length is to physically position the projection engine farther away from the screen. This method is undesirable because it increases the depth and overall footprint of the rear-projection system.

Another method of increasing the optical path length is to use a folded optical path. For example, see U.S. Pat. No. 6,181,386. Such folded optical paths have been suggested using a thin film polarizer scientifically based on the physical properties of the materials used to create the polarizer and on a continuous layered structure which creates the reflective properties of the polarizer. An example of this material is DBEF polarizer material sold by 3M. The thin-film layers are designed to constructively reflect one polarization while transmitting the other polarization. As the angle of incidence changes, the dimensions of the thin film layer also increase. The performance of the thin film material is degraded in the application as wide angles of incidence are needed to access larger dimensions. Thus, the folded optical path length is limited, and the thinness of the overall system is limited, by the limitations of the thin film material at larger angles of incidence.

To make a large screen rear-projection system with a small cabinet depth requires acceptance angles from approximately 25° to 75°.

SUMMARY OF THE INVENTION

It has been recognized that it would be advantageous to develop a wire grid polarizer or polarizer device capable of being used in a rear-projection system with an overall box depth of less than 7 inches. In addition, it has been recognized that it would be advantageous to develop a wire grid polarizer with certain optical performance and structure properties to increase contrast in a rear-projection system. In addition, it has been recognized that it would be advantageous to develop a wire grid polarizer with anti-reflective properties to enable the control of the ambient room light reflecting from the front screen of a rear-projection system.

The invention provides a projection display device, such as a rear projection television, for displaying an image. A screen has a front defined by where the image is viewed and a rear. A visible light wire-grid polarizer is disposed behind the screen with the screen having an array of parallel conductive nano-wires with a period less than 120 nm. An image projection engine is oriented to direct a polarized image beam containing an image towards the wire-grid polarizer. A linear polarization of the polarized image beam propagates in a plane oriented i) to contain a nano-wire of the wire-grid polarizer and ii) not within a plane of incidence to the array and iii) greater than 45 degrees to the array.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 4b is partial front schematic view of the system of FIG. 4a;

FIG. 5b is a partial front schematic view the system of FIG. 5a;

Figure 1:
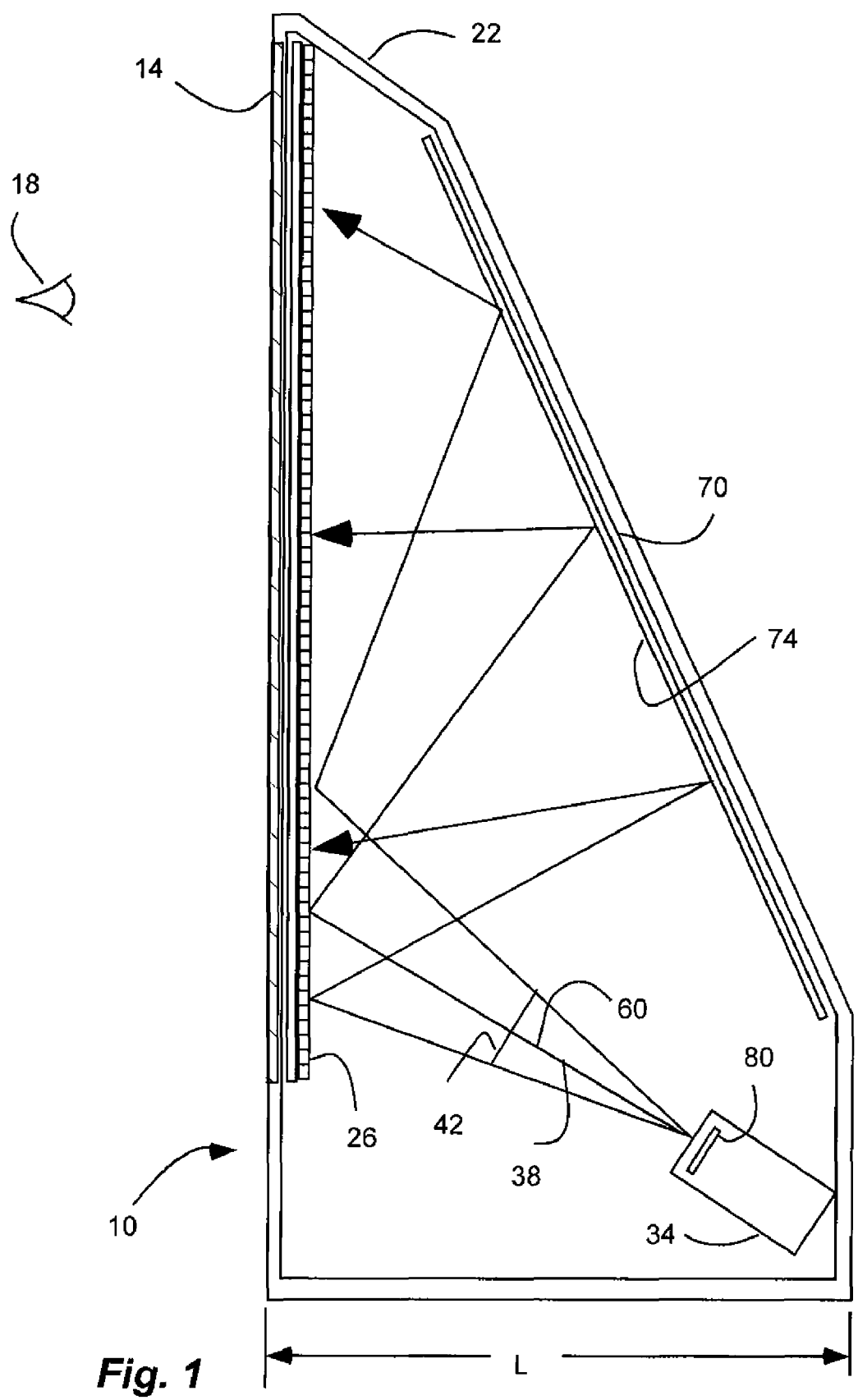
FIG. 1 is a cross-sectional side schematic view of a projection display system in accordance with an embodiment of the present invention with a wire-grid polarizer.
Figure 2:
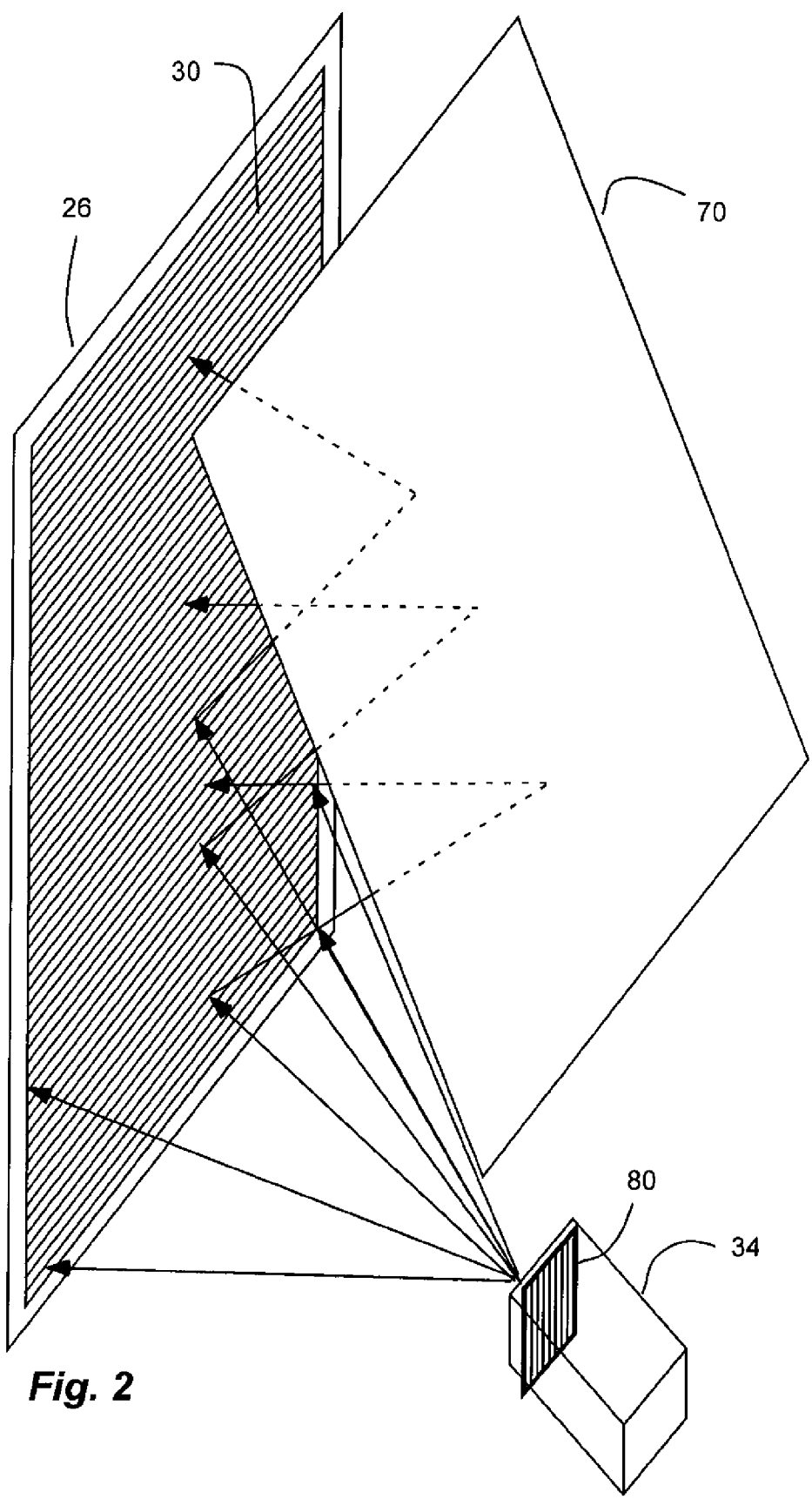
FIG. 2 is a partial perspective schematic view of the system of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

It has been recognized that a wire-grid polarizer can be utilized and optimized in a folded rear-projection system. Such a polarizer can have a steep acceptance angle. Wire-grid polarizers operate on principles related to the properties of the materials in the wire-grid, and on principles based on form birefringence, or the geometric structure of the wire-grid. It is therefore possible to create a wire-grid polarizer with the necessary performance to meet the requirements of a small-footprint, large-screen rear-projection system which cannot be met by thin-film materials with multiple, continuous thin film layers.

As illustrated in FIGS. 1-3c and 3e, a projection display system, indicated generally at 10, in an example implementation in accordance with the invention is shown. The system 10 is configured as a rear projection television. Such a system can be configured to receive and process an image signal, as is known in the art. The system 10 includes a screen 14 with a front defined by where the image is viewed by a viewer 18. The screen defines a front of the system, and has a rear facing into the system. The system can include a cabinet 22 or frame which carries or contains the components of the system and resists ambient light from entering into the system behind the screen. The screen has a size typically characterized by a diagonal dimension between opposite corners that is desired to be as large as possible. For example, the screen area is often desired to be greater than a square meter, with a width, height or diagonal greater than a meter. The system 10 or cabinet 22 has a front and a rear defining a depth L of the system which is desired to be as small as possible. For example, in one aspect the depth L of the system is desired to be less than one foot (30.5 cm), and in another aspect, less than 7 inches (18 cm).

As described above, the quest for larger screens and shallower systems is ongoing. Rear-projection systems, however, face a dichotomy in that increasing the screen size typically involves undesirably increasing the depth of the system, while decreasing the depth of the system typically involves undesirably decreasing the screen size. One proposed solution has been to fold the optics, or reflect the image within a shallower system. See U.S. Pat. Nos. 6,181,386; 6,473,236; 6,390,626; 6,339,454; and 6,580,471; which are herein incorporated by reference. Thus, the image beam is projected at a severe or steep angle towards a thin film polarizer at a front of the system, which reflects the image to a mirror at the back of the system, which reflects the image back out the front of the system, during which the polarization of the image has been rotated to allow it to pass through the thin film polarizer. The severe or steep angle required to keep the system shallow or thin, however, also limits the performance of the thin film polarizer, which is degraded at such steep angles. The present invention, however, utilizes one or more wire-grid polarizers and a specific configuration of the wire-grid polarizer to both preserve performance at steep angles and reduce the depth of the system.

Figure 5B:
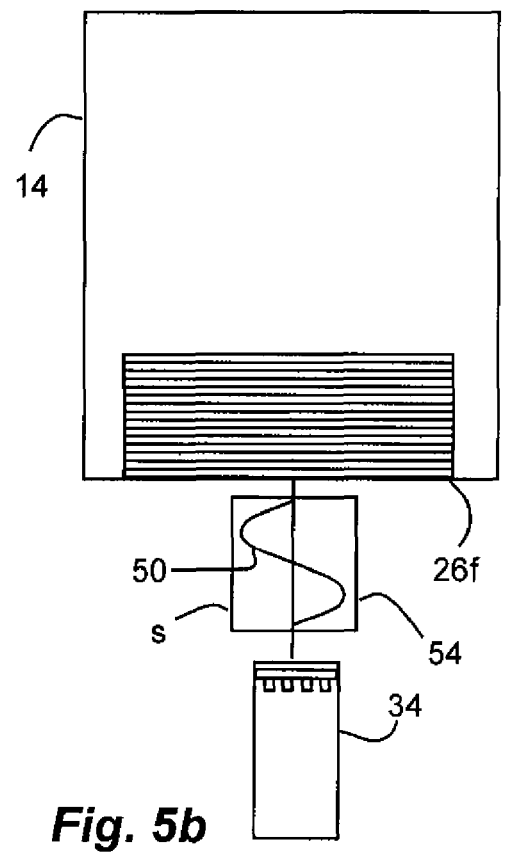
Figure 5A:
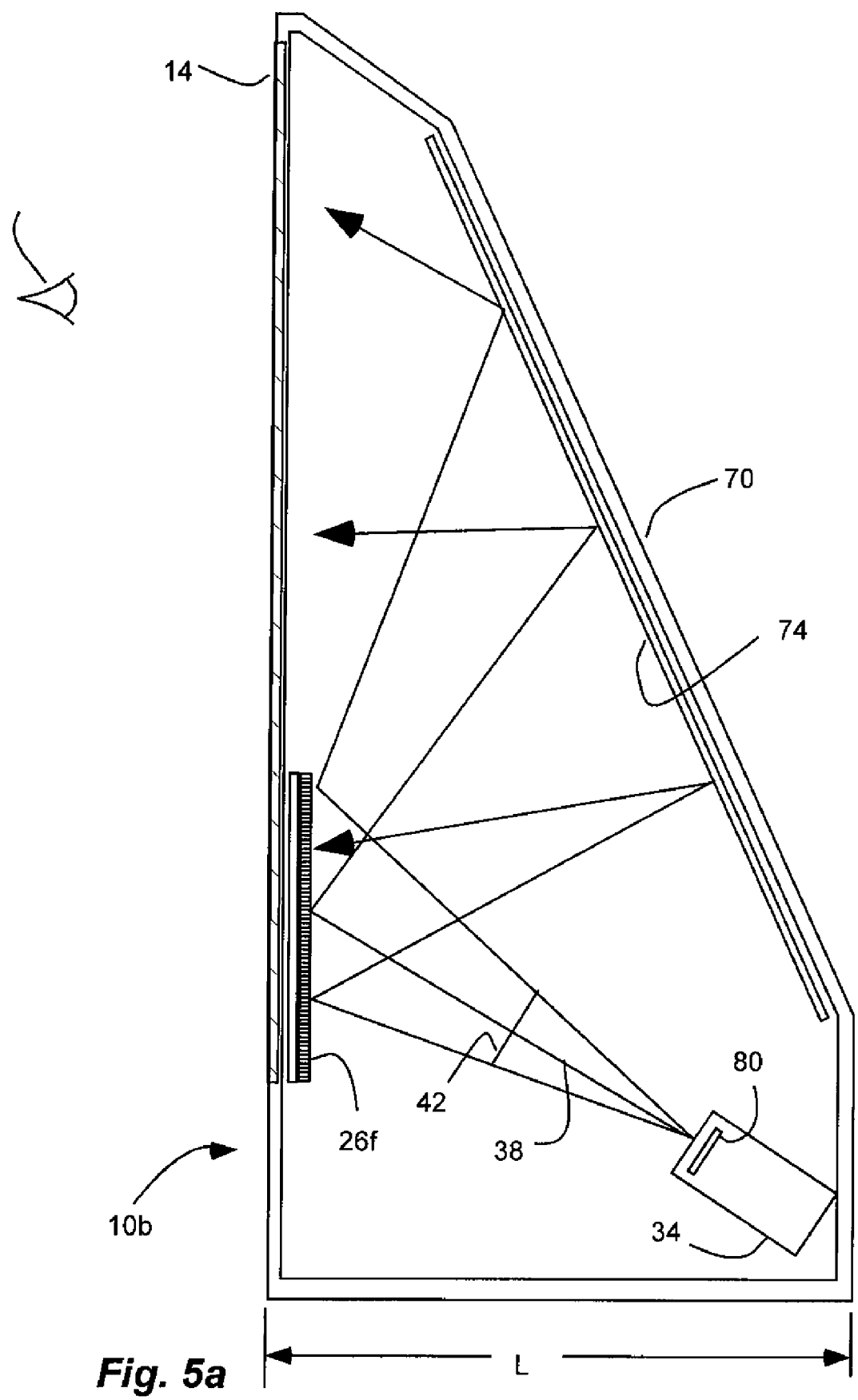
FIG. 5a is a cross-sectional side schematic view of another projection display system in accordance with another embodiment of the present invention.

A visible light wire-grid polarizer 26 is disposed behind the screen 14 and inside the cabinet 22. In one aspect, the wire-grid polarizer 26 can have a size substantially matching a size of the screen such that the wire-grid polarizer is substantially contiguous with the screen, as shown in FIGS. 1, 2, 3b and 3c. Thus, the wire-grid polarizer 26 can have a size or area greater than a square meter, with a width, height or diagonal greater than a meter. It is believed that having the screen and wire-grid polarizer the same size reduces any shadow or dimming in the image caused by a smaller polarizer, which shadow may be visible to the viewer under certain viewing conditions. Alternatively, the wire-grid polarizer 26f can be smaller than the screen and sized only as large as the image beam on its first encounter with the wire-grid polarizer, as shown in FIGS. 5a and 5b. Using a polarizer smaller than the screen size can reduce cost and can be easier to manufacture, but may cause a shadow or dimming on the screen. In one aspect, a single large wire-grid polarizer can be fabricated and used, such as shown in FIGS. 1, 2, 3b and 3c. Using a single polarizer can be easier to assemble with the system and can present better picture quality free of joining lines. Alternatively, the wire-grid polarizer 26 can be formed by a plurality of smaller wire-grid polarizers 26a-d tiled together to form the desired size, as shown in FIG. 3f. Joining several smaller polarizers can reduce the costs of polarizer fabrication, but might make assembly more difficult and may introduce faint joint lines in the image.

Figure 3A:
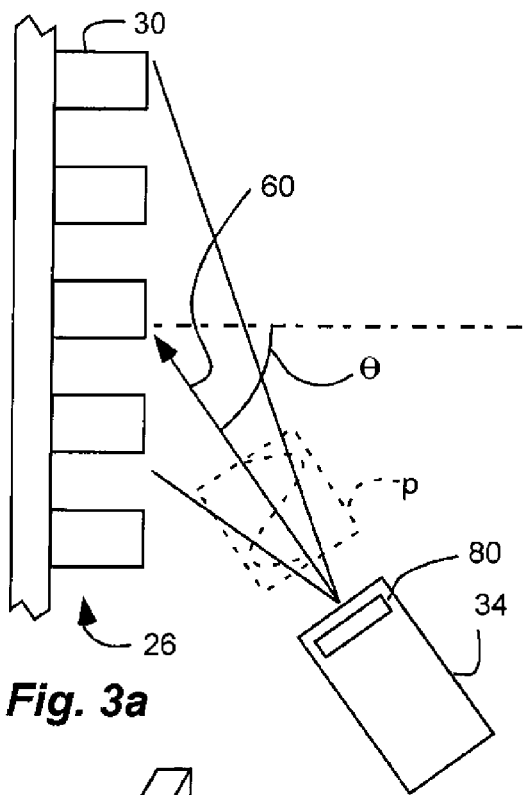
FIG. 3a is a partial side schematic view of the system of FIG. 1.
Figure 3B:
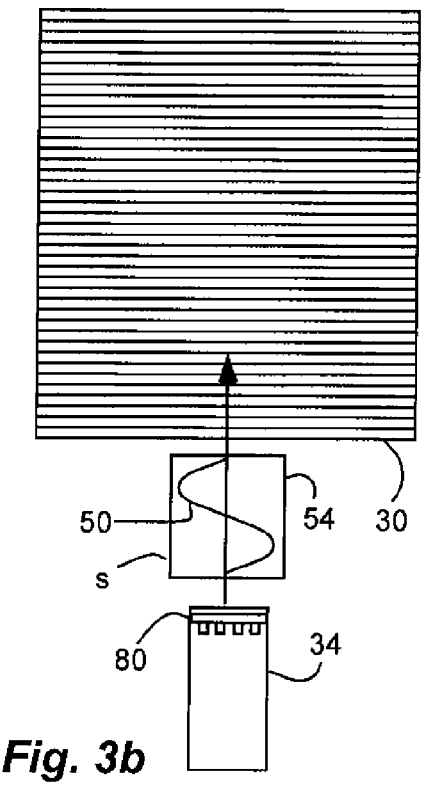
FIG. 3b is a partial front schematic view of the system of FIG. 1.
Figure 3C:
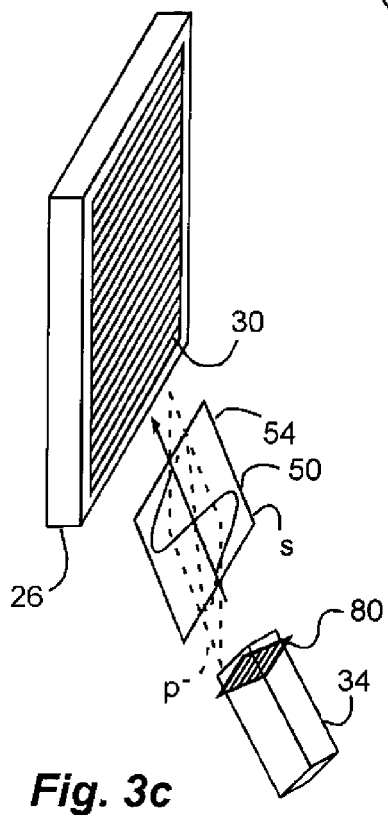
FIG. 3c is a partial perspective schematic view of the system of FIG. 1.
Figure 3D:
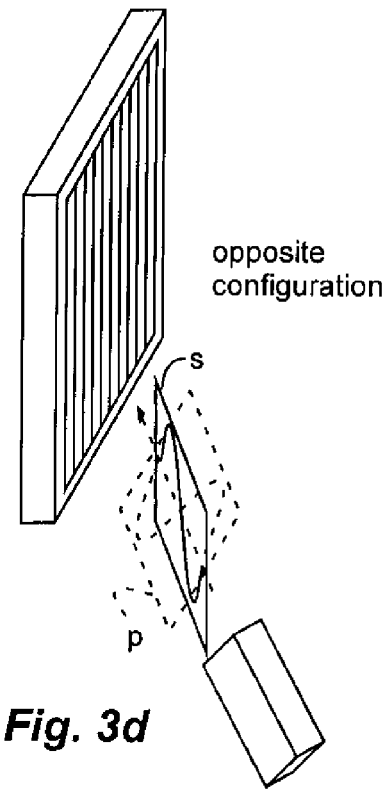
FIG. 3d is a partial perspective schematic view of a system with an opposite configuration to that of FIG. 1.
Figure 3E:
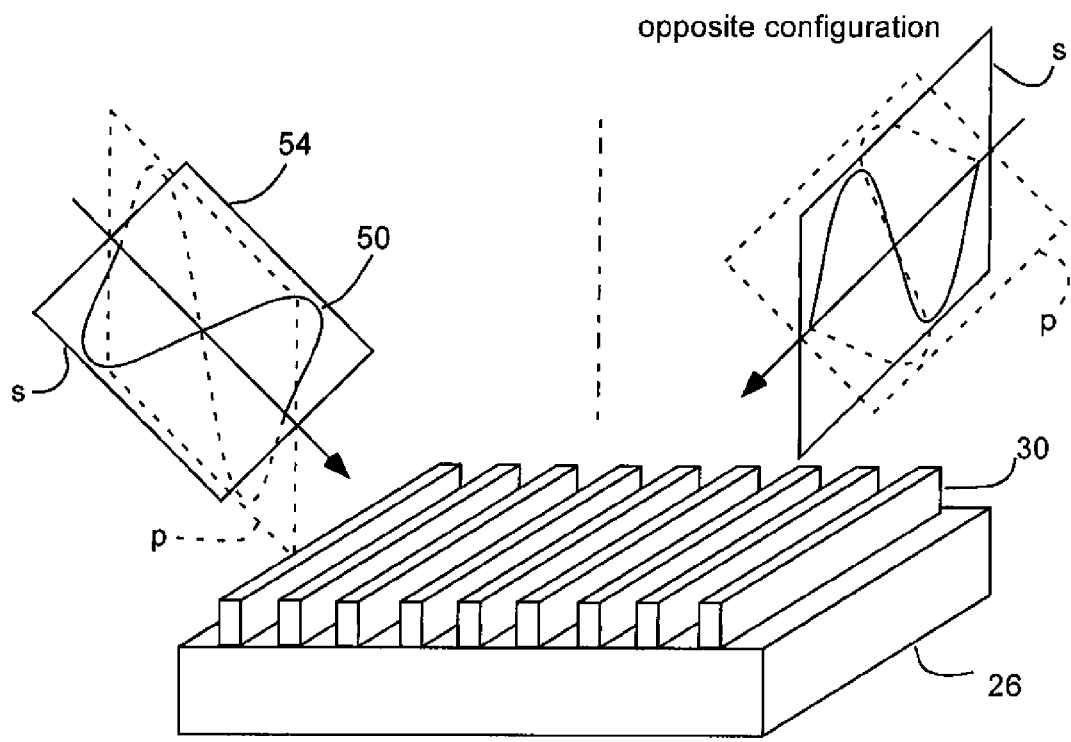
FIG. 3e is a perspective schematic view showing the configuration of FIG. 1 and an opposite configuration.
Figure 3F:
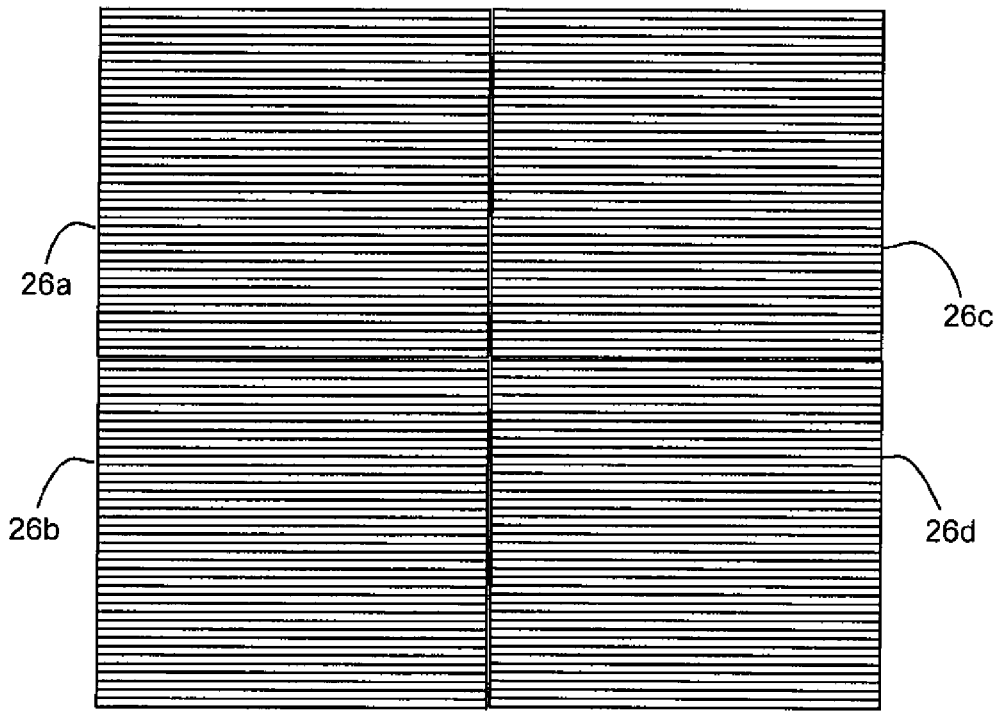
FIG. 3f is a front view of a wire-grid polarizer in accordance with an embodiment of the present invention.

The wire-grid polarizer 26 has an array of parallel nano-wires 30 (FIGS. 3a and 3e). The wires 30 are formed of a conductive material such as aluminum or silver, and have a length greater than the wavelength of visible light (greater than 700 nm) and a period less than half the wavelength of visible light (less than 200 nm). In one aspect, the period can be less than 200 nm. In another aspect, the period can be less than 120 nm. The wires can be formed on a substrate such as by patterning processes such as lithography. Alternatively, the wires can be deposited on a substrate with molded ribs that is stretched to reduce the size or period of the ribs.

An image projection engine 34 is disposed in the cabinet 22 and oriented to direct a polarized image beam 38 containing an image (represented at 42) towards the wire-grid polarizer 26. The image projection engine 34 can be of any appropriate type, as is known in the art. The image projection engine 34 can include a light source and various optics, such as collimating lens(es), focusing lens(es), etc. In addition, the image projection engine 34 can include a light modulator(s) such as liquid crystal displays (LCDs) whether reflective or transmissive, liquid crystal on silicon (LCOS), etc. Furthermore, the image projection engine 34 can include color separating optics or devices, or electronics to modulate different colors. Various aspects of light engines are disclosed in U.S. Pat. Nos. 6,234,634; 6,447,120; 6,666,556; 6,585,378; 6,909,473; 6,900,866; 7,061,561; 6,982,733; 7,023,512; 6,954,245; 7,184,115; 6,805,445; 7,131,737; 6,769,779; and U.S. patent application Ser. No. 11/198,916; which are herein incorporated by reference. It will be appreciated that the image projection engine can provide an image in a single color, modulate between three different colors, or be capable of providing the image in three different colors, or three different color beams that are later combined.

The image projection engine 34, and/or the polarized image beam 38, is oriented to direct a linear polarization (represented at 50 in FIGS. 3b and 3c) of the polarized image beam 38, propagating in a polarization plane (represented at 54 in FIGS. 3b and 3c), that is oriented to contain one of the nano-wires 30 of the wire-grid polarizer 26. The polarization plane 54 and the individual nano-wire may be described as parallel with respect to one another. The linear polarizer is oriented with respect to the image beam to reflect what is commonly known in optics as the s-polarization. In addition, the image projection engine 34, and/or the polarized image beam 38, is oriented so that the polarization plane 54 is not within a plane of incidence with respect to the array. Thus, the polarization plane is non-perpendicular to the array of nano-wires. Furthermore, the image projection engine 34, and/or the polarization image beam 38, is oriented at an angle greater than 45 degrees to the array of nano-wires; or the optical axis of the image projection engine is oriented at an angle greater than 45 degrees with respect to the array. Thus, as shown in FIG. 3e, the image projection engine 34 and/or polarized image beam 38 is oriented so that the polarization plane 54: 1) contains a nano-wire 30, 2) is not within a plane of incidence with respect to the array of nano-wires, and 3) is at an angle greater than 45 degrees to the array of nano-wires. In addition, the nano-wires are parallel with the s-polarization orientation.

The opposite configuration is shown in FIGS. 3d and 3e, with the linear polarization 50 and the plane 54 rotated to be oriented to contain a nano-wire, striking the plane defined by the array at an angle greater than 45 degrees with respect to the normal to the array, but with the polarization plane 54 orthogonal to the plane of the array, or within the plane of incidence. Thus, the opposite orientation has the polarization plane within the plane of incidence. In addition, the nano-wires are perpendicular to the s-polarization orientation. Referring to FIG. 3e, the desired orientation of the s-polarization plane is not within a plane of incidence with respect to the array.

Figure 8:
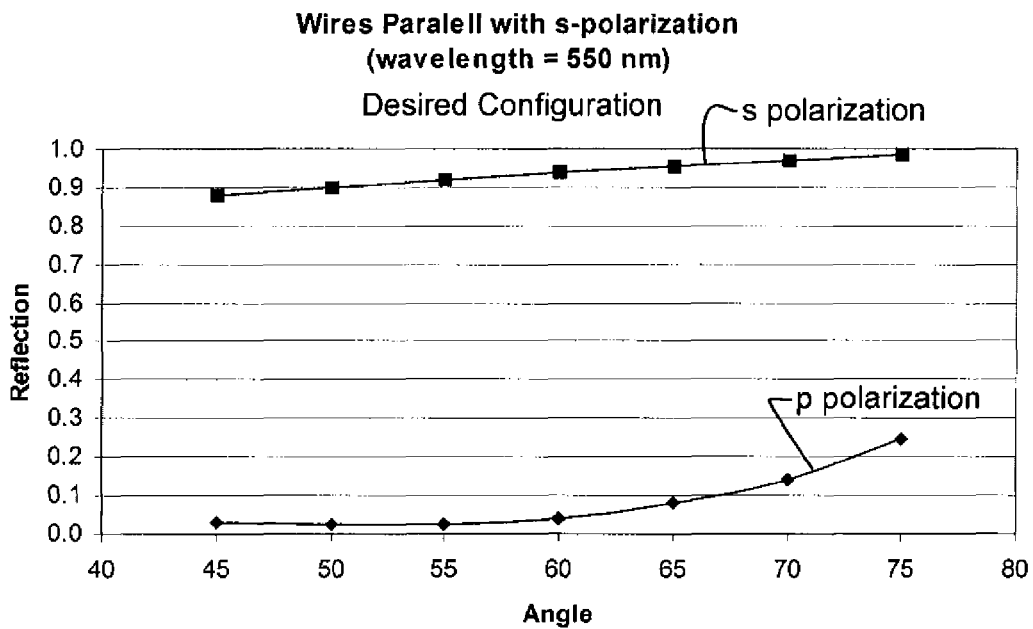
FIG. 8 is a graph of reflection versus angle for the wire-grid polarizer configuration of FIG. 1.
Figure 9:
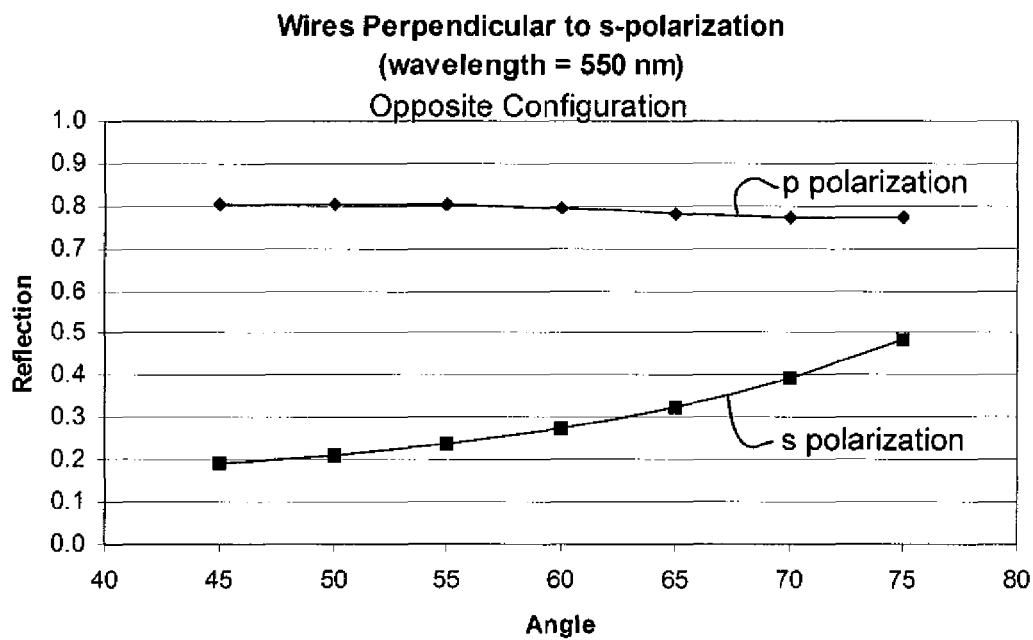
FIG. 9 is a graph of reflection versus angle for an opposite configuration to that of FIG. 1.

Referring to FIGS. 8 and 9, the performance of the desired orientation and the opposite orientation are compared. Referring to FIG. 8, the desired orientation (with s-polarization plane non-perpendicular to the array) has a reflection of almost 85% of the s-polarization orientation light, while reflecting less than 10% of the opposite p-polarization orientation light at angles less than 65 degrees, and less than 25% at less than 75 degrees. It will be noted in FIG. 8 that the desired orientation has both good efficiency, or reflection of the s polarization, and good polarization contrast. Conversely, referring to FIG. 9, the opposite orientation (with polarization plane perpendicular to the array) has less reflection of the desired polarization and more reflection of the undesired polarization. Thus, the opposite orientation results in both less efficiency, or reflection, and less contrast, both of which are undesirable in producing a good, high quality image.

Thus, referring to FIG. 8, the wire-grid polarizer 26 has a reflection of the image beam of at least 85% of incident light with its first encounter with the polarizer. In addition, the wire-grid polarizer 26 has a transmission of the image beam of at least 85% of the incident light with its second encounter with the polarizer (after reflecting off the mirror and passing through a waveplate so that the polarization is now rotated to pass through the wire-grid polarizer).

Referring to FIG. 3c, the image projection engine 34 can have an optical axis 60. The image projection engine can be oriented with the optical axis at an angle of incidence (measured from the surface normal to the wire grid) greater than 45 degrees. As shown in FIG. 8, performance has been measured up to 75 degrees. The greater the angle, the thinner the system 10 can be.

Referring to FIG. 1, the system 10 can be configured with the wire-grid polarizer 26 contiguous with the screen 14 at a front of the system, and the image projection engine 34 at a rear of the system and directed towards the polarizer. The image beam 38 from the image projection engine is polarized and is reflected from the polarizer (first encounter) towards a rear of the system. A mirror or reflector 70 is disposed at a rear of the system and reflects the image beam back towards the polarizer 26 and/or screen 14. Between the polarizer 26 and mirror 70 is a retarder 74, such as a quarter waveplate, that rotates or alters the polarization orientation of the image beam to an orthogonal polarization so that it can pass through the polarizer on the second encounter. Thus, an optical image path of the image beam 38 reaches the wire-grid polarizer 26 at least twice on its way to the screen. On the first encounter, the wire-grid polarizer reflects the image beam away from the screen. On a later encounter, the image beam is transmitted through the polarizer onto the screen. The retarder 74 is positioned in the optical image path such that the image beam reaches or passes through the retarder at least twice. The retarder has an effective retardation of ½ wavelength for the at least two passes through the retarder, thus rotating the polarization orientation to an orthogonal polarization.

Figure 4A:
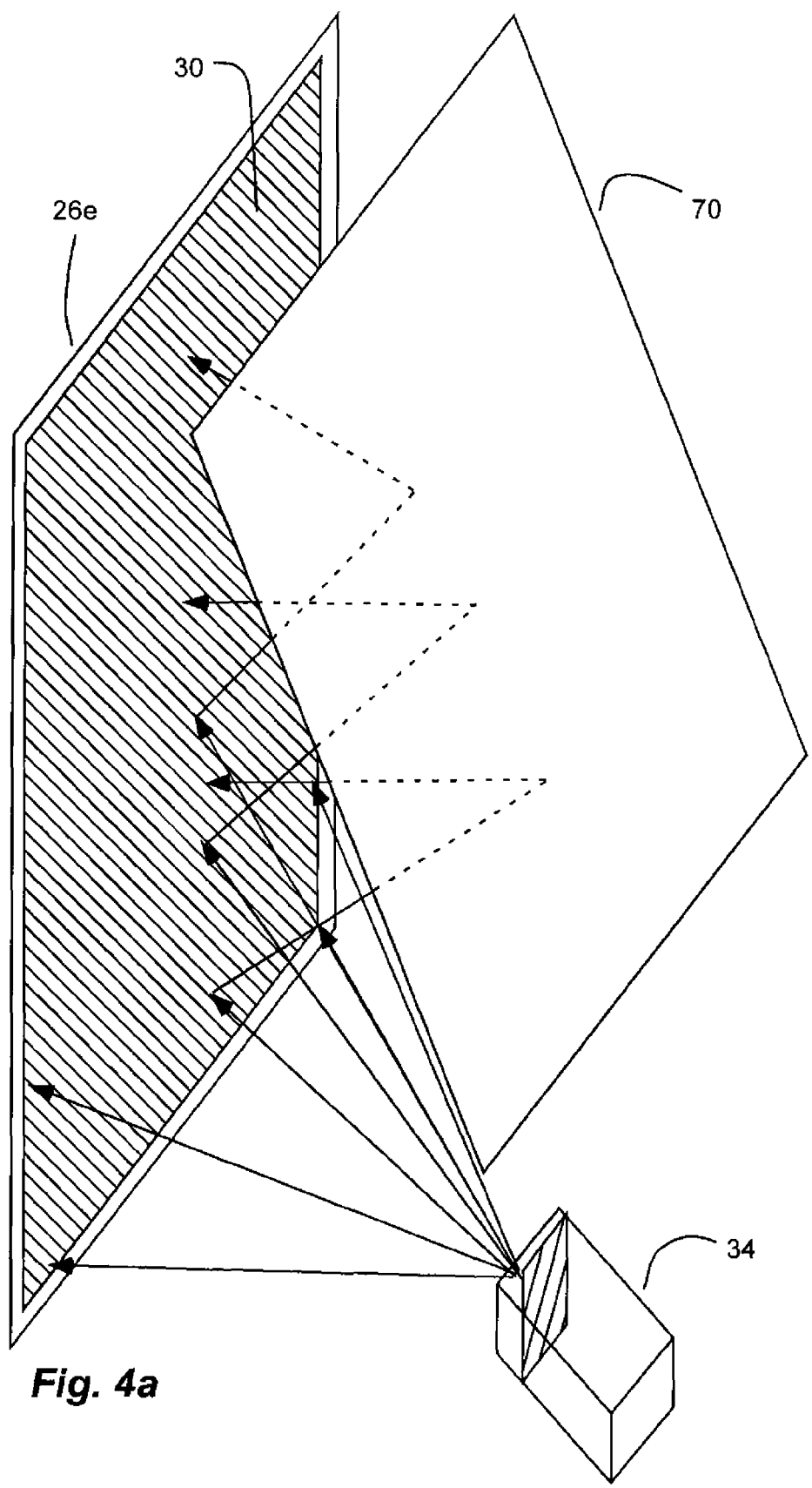
FIG. 4a is a partial perspective schematic view of another projection display system in accordance with another embodiment of the present invention.
Figure 4B:
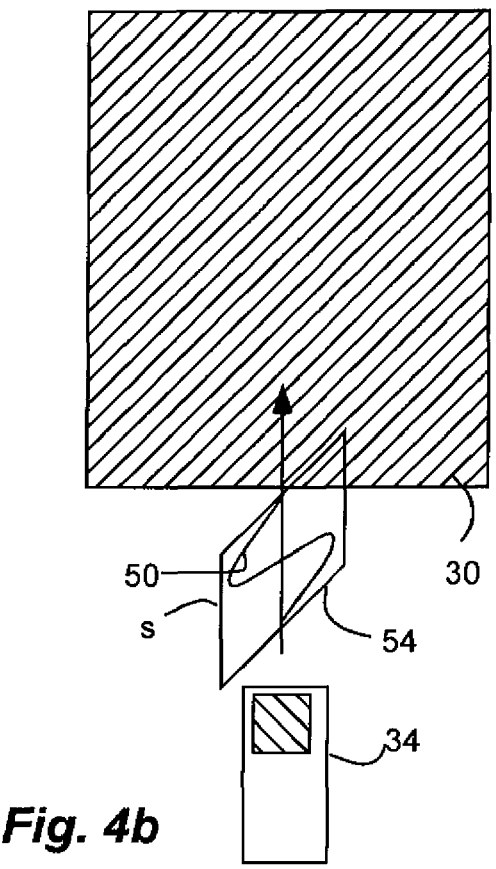

An exemplary configuration of the image projection system, image beam, polarization plane, and nano-wires of the wire-grid polarizer are shown in FIGS. 1-3c, namely with the polarization plane oriented at an incline and the nano-wires oriented horizontally. Referring to FIG. 1, the image projection engine 34 can be disposed below the wire-grid polarizer 26 and screen. Referring to FIGS. 2, 3a, 3b and 3c, the image projection engine 34 is oriented to direct the image beam 38 at an incline. The polarization of the image beam can propagate in a plane that is inclined from the image projection engine to the wire-grid polarizer, as shown in FIG. 3c. The nano-wires 30 of the wire-grid polarizer 26 are oriented horizontal, as shown. Such a configuration is believed to be most desirable to position heavier components at a bottom of the system while elevating the screen. Referring to FIGS. 4a and 4b, another configuration is shown with the polarization plane of the image and the nano-wires of the wire-grid polarizer 26e disposed at an acute angle with respect to horizontal, such as 45 degrees. Such a configuration still allows the image projection system to be positioned below the screen. Alternatively, it will be appreciated that the image projection engine can be positioned above the screen. It will be appreciated that other orientations may be desirable. For example, the image projection engine can be disposed laterally to the screen, with the polarization plane and nano-wires oriented vertically. Regardless of the position chosen for the engine, the polarization plane and the nano-wires must be oriented to preserve the relationship between the plane and the orientation of the nano-wires. In other words, the configuration should always be oriented to reflect the s-polarization from the wire-grid array.

The image projection engine 34 can include a wire-grid pre-polarizer 80. The pre-polarizer 80 similarly has an array of parallel nano-wires that are oriented orthogonal to the nano-wires of the wire-grid polarizer 26. Thus, the orthogonal orientation of the pre-polarizer 80 removes undesired polarization (light in an orthogonal polarization plane with respect to the image) that would pass through the wire-grid polarizer 26 on the first pass and interfere or washout the desired image. In addition, the dual wire-grid polarizers have a synergistic effect that can increase contrast. The pre-polarizer 80 can be smaller than the polarizer 26 to reduce cost.

In addition, the wire-grid polarizer 26 can be oriented with the nano-wires 30 facing the image projection engine 34. Thus, the image beam 38 reflects off the nano-wires without passing through the substrate to prevent ghost images, depolarization due to birefringence, etc.

Referring to FIGS. 5a and 5b, another projection display system 10b is shown that is similar in many respects to that described above, but includes a wire-grid polarizer 26f that is smaller than the screen 14.

Figure 6:
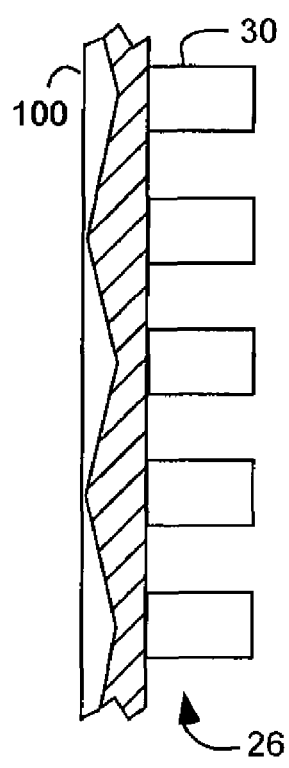
FIG. 6 is a partial cross-sectional side view of a wire-grid polarizer in accordance with an embodiment of the present invention.

Referring to FIG. 6, the wire-grid polarizer 26 can include a diffuse substrate 100 supporting the nano-wires 30 to scatter light as it passes through the polarizer to increase the viewing angle of the screen. The diffuse substrate 100 can include a plurality of facets oriented at different angles, that may be random or regular.

Figure 7:
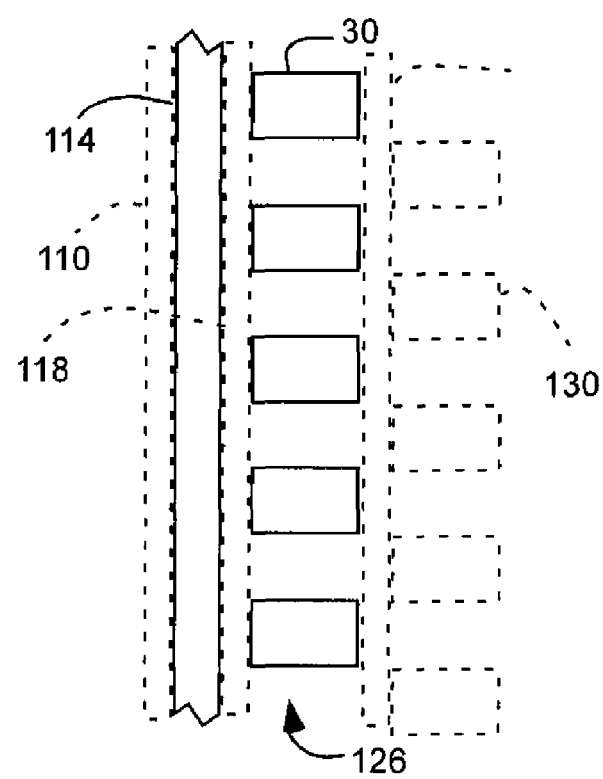
FIG. 7 is a partial cross-sectional side view of a wire-grid polarizer in accordance with an embodiment of the present invention.

Referring to FIG. 7, a light absorbing layer 110 is disposed in front of the nano-wires 30 of the wire-grid polarizer 126. The layer 110 can be disposed on the front of the substrate 114. Alternatively, the layer 118 can be disposed on a rear of the substrate 114. The light absorbing layer is configured to absorb ambient light from a front of the system 10.

In addition, the wire-grid polarizer 126 can include a second layer of nano-wires 130 disposed over the first. The wires can be aligned or off-set. The two polarizer layers can increase contrast and/or reflection.

Although the wire-grid polarizer and projection screen have been shown and described as separate components, it will be appreciated that the polarizer and screen can be combined as a single component, and such is intended by the scope of the claims, such as having the nano-wires formed on the screen, or the substrate of the polarizer also forming the screen.

Although a rear-projection television with a folded optical path has been described herein it will be appreciated that such a projection system can be employed in any type of display, including a computer monitor, for example.

Various aspects of folded optic projection systems are shown in U.S. Pat. Nos. 6,181,386; 6,339,454; 6,580,471; 6,473,236; 6,185,041; 6,746,122; 6,390,626; which are herein incorporated by reference.

Various aspects of wire grid polarizers or wire grid polarizing beam splitters are shown in U.S. Pat. Nos. 6,208,463; 6,288,840; 6,243,199; 6,785,050; 6,532,111; 6,714,350; 6,844,971; 6,665,119; and 6,788,461; which are herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A projection display device for displaying an image, comprising:
   a) a screen having a front defined by where the image is viewed and a rear;
   b) a mirror opposing the rear of the screen and oriented at an acute angle with respect to the screen;
   c) a retarder disposed between the screen and the mirror;
   d) a wire-grid polarizer substantially contiguous with the screen and having an array of parallel conductive nano-wires with a period less than 200 nm; and
   e) an image projection engine oriented to direct a polarized image beam containing an image towards the wire-grid polarizer with the image beam having a linear polarization and an optical axis; and
   f) the polarized image beam of the linear polarization propagating in a plane oriented: i) to contain a nano-wire of the array and ii) with an incidence angle with respect to the array greater than 45 degrees and iii) not within a plane of incidence with respect to the array.

2. A device in accordance with claim 1, further comprising: an optical image path which reaches the wire-grid polarizer at least twice on its way to the screen, with the wire-grid polarizer at one time reflecting the image beam traveling along the optical path away from the screen and at a different time transmitting the image beam onto the screen, and which reaches the retarder at least twice, with the retarder having an effective retardation of ½ wavelength for at least two passes through the retarder.

3. A device in accordance with claim 1, wherein the image projection engine includes:
   a wire-grid polarizer with an array of parallel nano-wires oriented orthogonal to the nano-wires of the wire-grid polarizer located at the screen.

4. A device in accordance with claim 3, wherein the polarizer included in the engine is smaller than the wire-grid polarizer at the screen.

5. A device in accordance with claim 1, wherein the image projection engine is oriented to direct the image beam at an incline with respect to horizontal, and wherein the nano-wires of the wire-grid polarizer are oriented horizontal.

6. A device in accordance with claim 1, wherein the nano-wires of the wire-grid polarizer are oriented at an acute angle with respect to horizontal.

7. A device in accordance with claim 1, wherein the image projection engine is oriented with respect to the wire-grid polarizer to have a reflection of the image beam of at least 85% during a first encounter and a transmission of the image beam of at least 85% during a second encounter.

8. A device in accordance with claim 1, further comprising:
   an optical image path generated by the image projection engine that reaches the wire-grid polarizer at least twice on its way to the screen, with the wire-grid polarizer at one time reflecting the image beam traveling along the optical path away from the screen and at a different time transmitting the image beam onto the screen; and
   a retarder positioned in the optical image path such that the image beam reaches the retarder at least twice, with the retarder having an effective total retardation of ½ wavelength for at least two passes through the retarder.

9. A device in accordance with claim 1, wherein the polarizer is the same size as the screen.

10. A device in accordance with claim 1, wherein the polarizer is smaller than the screen.

11. A device in accordance with claim 1, wherein the wire-grid polarizer has a front towards the screen and a rear towards the image projection engine; and further comprising:
    a light absorbing layer disposed in front of the nano-wires configured to absorb ambient light from a front of the device.

12. A device in accordance with claim 1, wherein the wire-grid polarizer is oriented with the nano-wires facing the image projection engine.

13. A device in accordance with claim 1, wherein the wire-grid polarizer includes a diffuse substrate supporting the nano-wires and configured to scatter light.

14. A device in accordance with claim 1, wherein the device is configured as a rear-projection television.

15. A projection display device for displaying an image, comprising:
    a) a screen having a front defined by where the image is viewed and a rear;
    b) a mirror opposing the rear of the screen and oriented at an acute angle with respect to the screen;
    c) a retarder disposed between the screen and the mirror;
    d) a wire-grid polarizer substantially contiguous with the screen and having an array of parallel conductive nano-wires with a period less than 200 nm; and
    e) an image projection engine oriented to direct a polarized image beam containing an image towards the wire-grid polarizer with the image beam having a linear polarization and an optical axis; and
    f) the polarized image beam of the linear polarization propagating in a plane oriented i) to contain a nano-wire of the array and ii) with an incidence angle with respect to the array greater than 45 degrees and iii) not within an angle of incidence with respect to the array; and
    g) the orientation of the image projection engine with respect to the wire-grid polarizer having a reflection of the image beam of at least 85% during a first encounter and a transmission of the image beam of at least 85% during a second encounter.

* * * * *